United States Patent [19]

Whitson

[11] Patent Number: 4,547,660
[45] Date of Patent: Oct. 15, 1985

[54] FEED BOX MONITORING DEVICE

[76] Inventor: Donald W. Whitson, 211 E. 5th, Scott City, Kans. 67871

[21] Appl. No.: 473,077

[22] Filed: Mar. 7, 1983

[51] Int. Cl.⁴ .............................................. G06M 1/00
[52] U.S. Cl. .................................. 235/103; 366/142; 235/128
[58] Field of Search ............... 235/103, 104, 105, 128; 366/601, 16, 152, 142

[56] References Cited

U.S. PATENT DOCUMENTS

| | | | |
|---|---|---|---|
| 1,410,126 | 3/1922 | Rosendahl | 235/128 |
| 3,234,911 | 2/1966 | Chubbuck | 119/51.11 |
| 3,272,180 | 9/1966 | Schommer | 119/52 |
| 3,468,519 | 9/1969 | Lorenzen | 119/51 R X |
| 3,496,343 | 2/1970 | Johanson | 235/103 |
| 3,548,165 | 12/1970 | Linnenkamp | 235/103 |
| 3,901,194 | 8/1975 | Meyer et al. | 119/53 |

Primary Examiner—L. T. Hix
Assistant Examiner—Brian W. Brown
Attorney, Agent, or Firm—Edwin H. Crabtree

[57] ABSTRACT

A feed box monitoring device for counting the revolutions of an auger or the like used in mixing two or more feed ingredients in a feed box. The device alerting an operator when a uniform mix has been obtained in the feed box.

6 Claims, 4 Drawing Figures

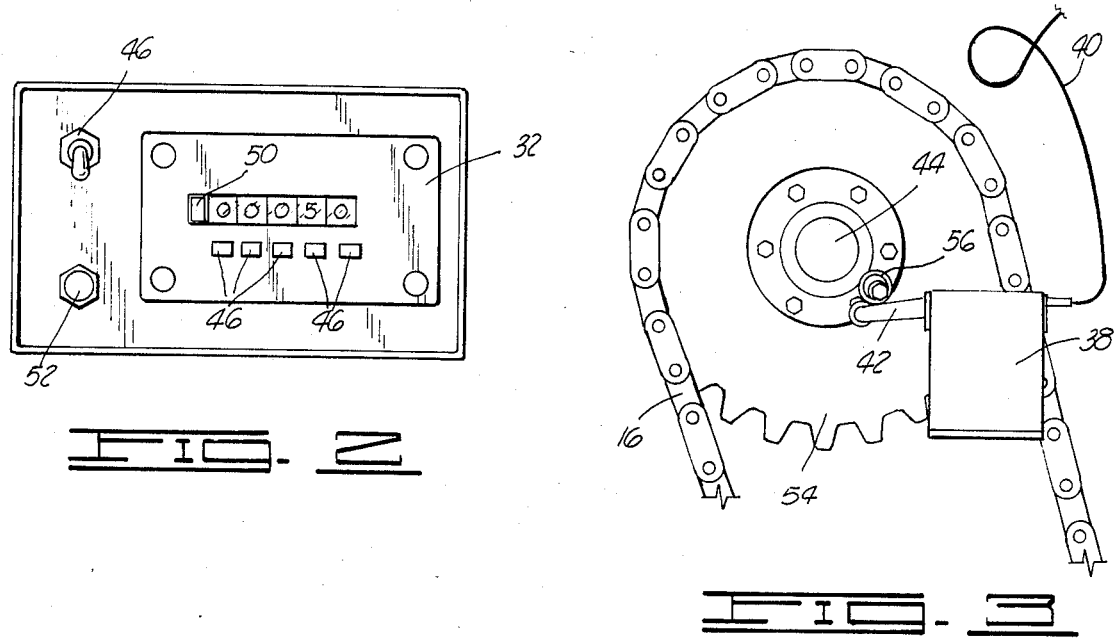
FIG. 2
FIG. 3
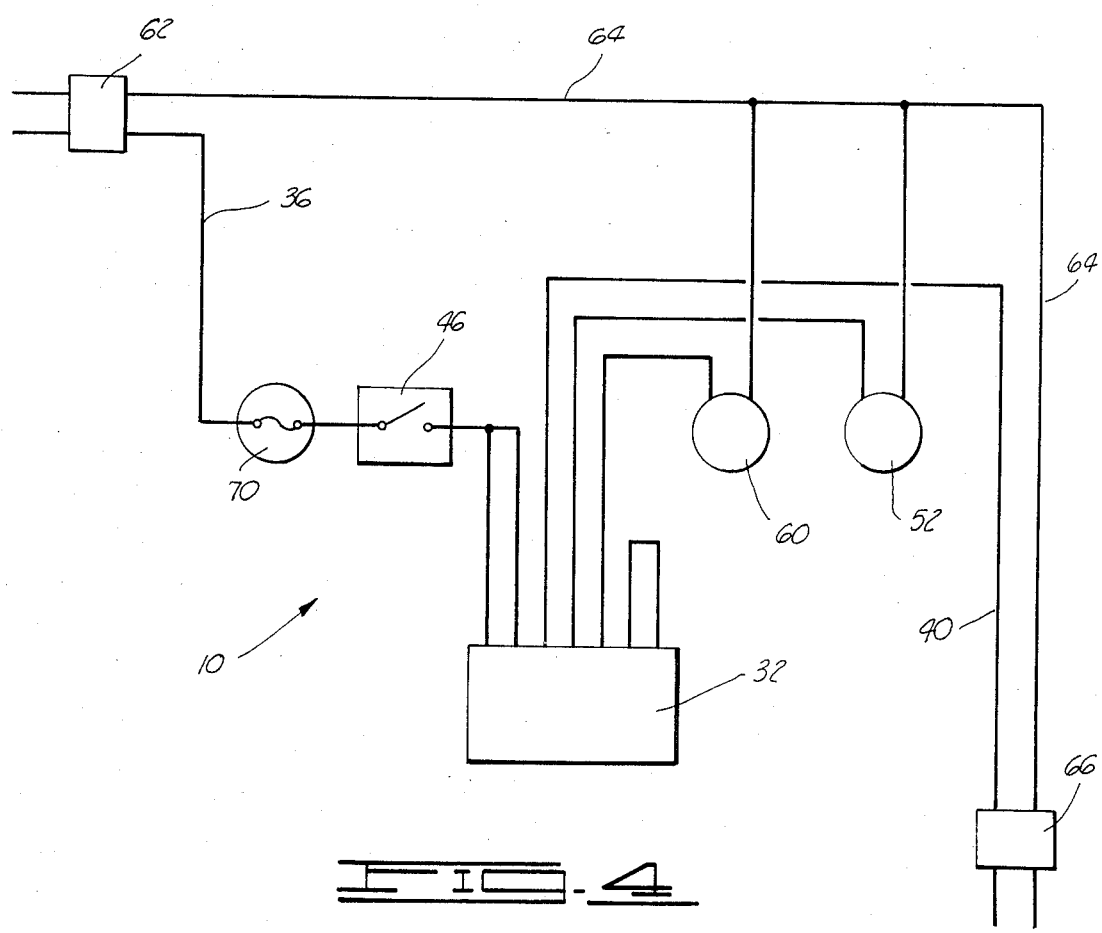
FIG. 4

FEED BOX MONITORING DEVICE

BACKGROUND OF THE INVENTION

This invention relates to a monitoring device for a feed box and more particularly a monitoring device for attaching to the side of the feed box and counting the revolutions of an auger or the like used in mixing two or more ingredients in the feed box. The device alerts the operator when a uniform mix has been obtained.

Heretofore, feed box mixers function by mechanically stirring or mixing two or more feed ingredients using augers or modified augers called ribbons. The amount of mixing or moving of the feed is determined by the revolutions made by the auger or ribbon. Uniform mixing is usually obtained and can be determined from each feed box by counting the number of revolutions made by the mixing auger within the feed box.

The accuracy of mixing is important because it is necessary to mix small or minute amounts of ingredients in a proper ratio. If the mix is under mixed, the amount of different materials added may not be evenly distributed. On the other hand if the mix is over mixed, the feed may become too fine or powdery and the animals or birds may not readily eat the mix.

Without the subject invention an operator of the feed box could use only time in relationship to the revolution of the auger or ribbon. Currently, operators use stop watches, hour glass timers and set the RPM's of a truck or trailer when a power take off is used in driving the auger. However, using these methods, the operator may not get the RPM's set for the proper time, or forget to time it correctly, or a different mix may be obtained because the timer is not accurate.

There have been various types of time controlled feeders and mixing apparatus for animals and birds. These can be found in U.S. Pat. No. 3,234,911 to Chubbuck, U.S. Pat. No. 3,272,180 to Schommer, U.S. Pat. No. 3,468,519 to Lorenzen and U.S. Pat. No. 3,901,194. None of the above mentioned patents particularly point out the advantages and the unique structure of the subject feed box monitoring device as described herein.

SUMMARY OF THE INVENTION

The feed box monitoring device eliminates errors in mixing different ingredients in a feed box to obtain a proper consistency desired.

Using the monitoring device, the operator of the feed box does not need to use a stop watch, timer or monitor the revolutions of the auger. The feed is mixed properly each time because the monitor is preset to indicate when a predetermined number of auger revolutions for each mix has been reached.

Also, the monitoring device can be readily adapted for stationary or vehicle mounted feed boxes.

Further, the feed box monitoring device includes an alarm for alerting the operator when a uniform mix has been obtained.

The feed box monitoring device for counting the revolutions of an auger or the like used in mixing two or more feed ingredients in a feed box includes a counter for counting the revolutions of the auger. A control panel having a control panel switch for turning power on and off from a power source may be mounted in the cab of a vehicle or any other desirable place. Also the control panel may be part of a set of scales or other measuring and weighing device. The counter is mounted on the control panel. A feed box switch is connected to the power source and adapted for mounting adjacent the feed box. The switch includes a switch arm for contacting part of the auger as it makes each revolution. The switch arm opens and closes the feed box switch during each revolution. The feed box switch is connected to the counter for counting down each revolution of the auger. When the revolutions of the auger have been counted down an audio or visual alarm is sounded for alerting the operator the proper number of revolutions have been counted by the counter.

The advantages and objects of the invention will become evident from the following detailed description of the drawings when read in connection with the accompanying drawings which illustrate preferred embodiments of the invention.

BRIEF DESCRIPTION OF THE DRAWINGS

FIG. 2 is a front view of the control panel.

FIG. 3 is a front view of the feed box switch mounted adjacent the drive shaft of the auger.

FIG. 4 is an electrical diagram of the feed box monitoring device.

DETAILED DESCRIPTION OF THE DRAWINGS

Figure 1:
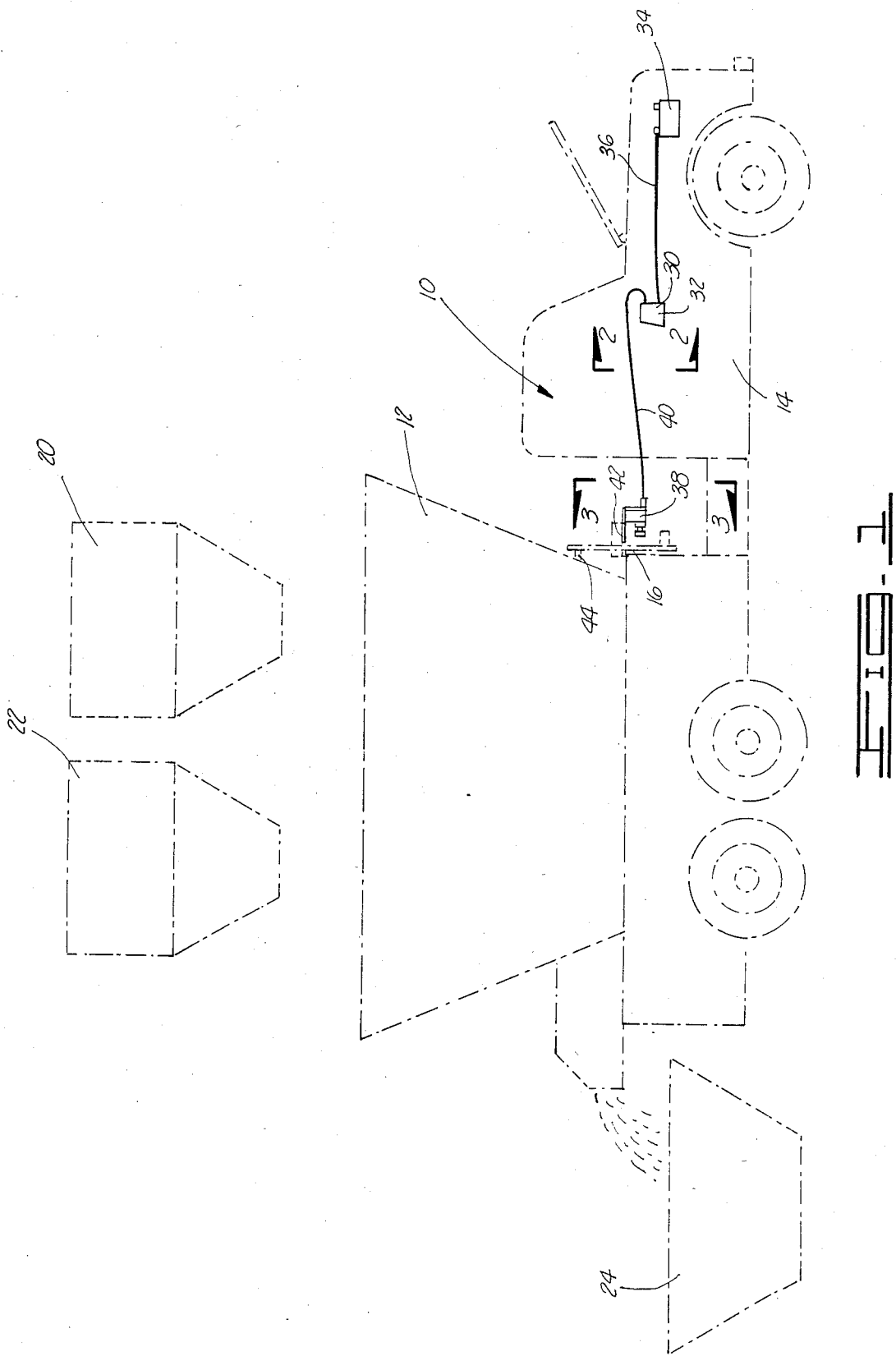
FIG. 1 illustrates the feed box monitoring device mounted on a vehicle and attached to the side of a feed box counting the revolutions of an auger in a feed box.

In FIG. 1 the feed box monitoring device is designated by general reference numeral 10. The device 10 is used for counting the revolutions of an auger, ribbon or the like mounted inside a feed box 12. The feed box 12 in this illustration is shown mounted on the rear of a vehicle 14. It should be kept in mind while the vehicle 14 is shown the feed box 12 can also be stationary mounted. The auger or ribbon or a plurality of augers and ribbons, while not shown in the drawings, can be driven by an endless chain 16 attached to a power take off of a drive shaft of the vehicle 14. While the use of a power take off system of the vehicle 14 is shown a separate electric drive, hydraulic drive or the like can be used for driving the auger.

The feed box 12 mounted on the rear of the vehicle 14 receives two or more feed ingredients from feed tanks 20 and 22. When the two or more feed ingredients have been completely mixed in the feed box 12 they can be discharged into a feed trough 24 or any other similar feed receiving device for use in feeding animals or fowl.

In FIG. 1 part of the feed box monitoring device 10 includes a control panel 30 having a counter 32 mounted thereon and connected to a power source 34 via lead 36. The power source 34 may be the vehicle's battery, or any other type of power supply. The counter 32 is also connected to a feed box switch 38 via lead 40. The feed box switch may be a mechanical or electronic switch. The feed box switch 38 includes a switch arm 42 which is positioned adjacent the end of a drive shaft 44 of one of the augers mounted in the feed box 12. This structure will be shown in greater detail in FIG. 3. While the switch 38 with switch arm 42 is shown it can be appreciated that various other types of mechanical, magnetic and electrical switches can be used equally well for counting the revolutions of the auger or rotating part of the feed box.

In FIG. 2 a front view of the control panel 30 and counter 32 can be seen. The control panel 30 includes a control panel switch 46 for turning power on and off to the counter 32 from the power source 34. The counter 32 includes buttons 48 for setting the number of revolutions required in providing the proper uniform mix of the feed ingredients. In this case, the face of the counter 32 shows, for example, fifty revolutions are required for a proper mix. The counter 32 also includes a depressed button 50 which is used to remove the number of revolutions present on the counter and for applying a different number of revolutions. Also the counter 32 includes a reset button 52 which is used for resetting the counter 32 to the original 50 revolutions after the auger has turned 50 revolutions and it is desired to mix additional ingredients the same number of revolutions. The reset button 52 is connected to both the counter 32 and the power supply 34. If required the reset button 52 may be mounted outside the control panel 30.

In FIG. 3 the feed box switch 38 can be seen mounted adjacent the end of the drive shaft 44 of the auger. While the auger is not shown it can be appreciated the drive shaft 44 extends outwardly from the interior of the feed box 12 where it is driven by a drive sprocket 54 connected to the endless chain 16. As the drive shaft 44 makes one revolution a cam 56 is mounted thereon which engages the switch arm 42. As the cam 56 engages the switch arm 42 the feed box switch 38 is opened and closed during each revolution. As this happens, the revolutions on the counter 32 are counted down until the counter reaches 0. At this time, an alarm 60 shown in FIG. 4 is sounded to alert the operator that a uniform mix has been obtained and to shut down the feed box operation and discharge the uniform mixed ingredients therefrom.

In FIG. 4 an electrical diagram of the feed box monitoring device 10 is shown. The device 10 further includes a power plug 62 which is used to connect to the power supply 34. From power plug 62 a lead 64 is connected to a switch plug 66 which is connected to the feed box switch 38 for applying power thereto. The lead 64 is also connected to the reset button 52 and the alarm 60. It should be pointed out the alarm 60 may be an audio or visual alarm which could include a horn, lights, and could further be the horn or lights of the vehicle 14 should the feed box 12 be mounted on the rear of a vehicle 14. From power plug 62 the lead 36 is connected to a fuse 70 and from there to the control panel switch 46 which in turn is connected to the counter 32.

Changes may be made in the construction and arrangement of the parts or elements of the embodiments as described herein without departing from the spirit or scope of the invention defined in the following claims.

What is claimed is:

1. A feed box monitoring device for counting the revolutions of an auger or the like used in mixing two or more feed ingredients in a feed box mounted on the rear of a vehicle or trailer, the device further alerting an operator when a uniform mix has been obtained, the device comprising:
   a counter for counting the revolutions of the auger;
   a control panel having a control panel switch for turning power on and off from a power source in the vehicle to the counter, the counter mounted on the control panel with the control panel adapted to be mounted in a cab of the vehicle;
   a feed box switch connected to the power source and adapted for mounting adjacent the feed box, the switch having a switch arm for contacting part of the auger as it makes each revolution, the switch arm opening and closing the feed box switch during each revolution, the feed box switch connected to the counter for counting down to zero each revolution of the auger; and
   an alarm means adapted to be connected to the power source and to the counter for sounding an alarm when a required number of revolutions have been counted to zero by the counter.

2. The device as described in claim 1 further including a reset button mounted on the control panel and adapted to be connected to the power source of the vehicle and the counter, by pushing the reset button a previous number of revolutions counted can be reset on the counter.

3. The device as described in claim 1 wherein the alarm means is the vehicle's horn.

4. The device as described in claim 1 wherein the alarm means is the vehicle's lights.

5. The device as described in claim 1 further including a cam mounted on one end of a drive shaft, the drive shaft adapted to be mounted on the auger, the switch arm contacting the cam as the drive shaft rotates the auger.

6. A feed box monitoring device for counting the revolutions of an auger or the like used in mixing two or more feed ingredients in a feed box mounted on the rear of a vehicle or trailer, the auger having a chain driven drive shaft mounted therein with one end extending outwardly therefrom, the device further alerting an operator when a uniform mix has been obtained, the device comprising:
   a counter for counting the revolutions of the auger;
   a control panel having a control panel switch adapted for turning power on and off from a power source in the vehicle to the counter, the counter mounted on the control panel with the control panel adapted to be mounted in a cab of the vehicle;
   a feed box switch connected to the power source and adapted for mounting adjacent the feed box, the switch having a switch arm;
   a cam mounted on one end of the drive shaft, the switch arm adapted to contact the cam as the drive shaft rotates the auger, the switch arm opening and closing the feed box switch during each revolution, the feed box switch connected to the counter for counting down to zero each revolution of the auger; and
   an alarm means connected to the power source and to the counter for sounding an alarm when a required number of revolutions have been counted to zero by the counter.

* * * * *